(12) United States Patent
Dutta et al.

(10) Patent No.: US 10,683,990 B2
(45) Date of Patent: Jun. 16, 2020

(54) SOLID-STATE HORTICULTURAL LAMP

(71) Applicants: Arunava Dutta, Winchester, MA (US); Janet Milliez, Cambridge, MA (US); Jason Li, Boxford, MA (US)

(72) Inventors: Arunava Dutta, Winchester, MA (US); Janet Milliez, Cambridge, MA (US); Jason Li, Boxford, MA (US)

(73) Assignee: LEDVANCE LLC, Wilmington, MA (US)

( * ) Notice: Subject to any disclaimer, the term of this patent is extended or adjusted under 35 U.S.C. 154(b) by 416 days.

(21) Appl. No.: 15/424,135

(22) Filed: Feb. 3, 2017

(65) Prior Publication Data

US 2018/0224093 A1    Aug. 9, 2018

(51) Int. Cl.
*F21V 9/40*    (2018.01)
*F21K 9/23*    (2016.01)
*A01G 7/04*    (2006.01)
*A01G 22/00*   (2018.01)
*F21Y 115/10*  (2016.01)
*F21Y 113/13*  (2016.01)

(52) U.S. Cl.
CPC .............. *F21V 9/40* (2018.02); *A01G 7/045* (2013.01); *A01G 22/00* (2018.02); *F21K 9/23* (2016.08); *F21Y 2113/13* (2016.08); *F21Y 2115/10* (2016.08); *Y02P 60/149* (2015.11)

(58) Field of Classification Search
CPC .......... A05G 22/00; A05G 7/045; A05G 7/04; Y02P 60/149
USPC ........................................................ 362/563
See application file for complete search history.

(56) References Cited

U.S. PATENT DOCUMENTS

| 6,528,954 | B1* | 3/2003 | Lys | A61N 5/0616 |
| | | | | 315/158 |
| 6,921,182 | B2* | 7/2005 | Anderson, Jr. | A01G 7/045 |
| | | | | 362/230 |
| 8,333,487 | B2* | 12/2012 | Mekhtarian | A01G 7/045 |
| | | | | 362/249.02 |
| 9,060,468 | B2* | 6/2015 | Klase | F21V 5/007 |
| 9,137,874 | B2 | 9/2015 | Maxik et al. | |
| 9,220,202 | B2* | 12/2015 | Maxik | A01G 7/045 |
| 9,275,979 | B2* | 3/2016 | Tong | H01L 25/0753 |
| 10,368,497 | B2* | 8/2019 | McReynolds | H05B 45/20 |
| 2005/0040772 | A1* | 2/2005 | Guzman | H05B 33/0842 |
| | | | | 315/291 |
| 2006/0006820 | A1* | 1/2006 | Roseman | A01G 7/045 |
| | | | | 315/312 |

(Continued)

*Primary Examiner* — Michael H Wang
(74) *Attorney, Agent, or Firm* — Hayes Soloway (57) ABSTRACT

A solid-state horticultural lamp is disclosed. The lamp emits a spectrum of light including a first local emission peak between 400-500 nm and a first spectral power distribution (SPD) intensity and a second local emission peak between 500-600 nm and a second SPD intensity, wherein the second SPD intensity normalized to the first SPD intensity is between 0.15-0.35. The spectrum further includes a third local emission peak between 600-700 nm and a third SPD intensity, wherein the third SPD intensity normalized to the first spectral power distribution intensity is between 2.4-2.8. In some cases, a photosynthetic photon flux (PPF) of the light between 600-700 nm is between 3.5-4.5 times a PPF of the light between 400-500 nm, and a PPF of the light between 600-700 nm is between 3.8-4.2 times a PPF of the light between 400-500 nm.

20 Claims, 5 Drawing Sheets

(56) References Cited

U.S. PATENT DOCUMENTS

| | | | |
|---|---|---|---|
| 2010/0287830 A1* | 11/2010 | Chen | A01G 7/045 47/58.1 LS |
| 2011/0205733 A1* | 8/2011 | Lenderink | F21V 9/08 362/231 |
| 2012/0161170 A1* | 6/2012 | Dubuc | A01G 7/045 257/89 |
| 2013/0139437 A1* | 6/2013 | Maxik | H05B 37/02 47/58.1 LS |
| 2016/0192598 A1* | 7/2016 | Haggarty | A01G 7/045 315/297 |
| 2016/0338168 A1* | 11/2016 | Rantala | H05B 33/0857 |
| 2017/0020084 A1* | 1/2017 | Alfier | F21V 29/503 |
| 2017/0086391 A1* | 3/2017 | Vilgiate | A01G 7/045 |
| 2017/0094756 A1* | 3/2017 | Saffari | H05B 37/0272 |
| 2017/0102132 A1* | 4/2017 | Cho | A01G 7/045 |
| 2017/0241632 A1* | 8/2017 | Nguyen | F21V 29/59 |
| 2018/0084733 A1* | 3/2018 | Adams | H05B 33/0827 |

* cited by examiner

Figure 6a  Blue & Red
(375 mA each)

Figure 6b  Blue string only
(750 mA)

Figure 6c  Red string only
(750 mA)

Figure 7

SOLID-STATE HORTICULTURAL LAMP

FIELD OF THE DISCLOSURE

The present disclosure relates to solid-state lighting (SSL) and more particularly to light-emitting diode (LED)-based horticultural lamps.

BACKGROUND

As a branch of agriculture, horticulture encompasses the science and art pertaining to cultivating edible, medicinal, and ornamental plants and fungi. Generally, horticulture impacts one's daily life by providing fruits and vegetables suitable for consumption, flowers and vegetation that provide visual and other sensory enjoyment, components for medicines, and promoting recreational activities.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A solid-state horticultural lamp is disclosed. In accordance with some embodiments, a lamp provided as described herein may be configured to emit a spectrum of light including: (1) a first local emission peak at a wavelength between 400-500 nm and having a first spectral power distribution (SPD) intensity; (2) a second local emission peak at a wavelength between 500-600 nm and having a second SPD intensity; and (3) a third local emission peak at a wavelength between 600-700 nm and having a third SPD intensity. In some cases, the second SPD intensity normalized to the first SPD intensity may be in the range of about 0.15-0.35, and the third SPD intensity normalized to the first spectral power distribution intensity may be in the range of about 2.4-2.8. In some instances, a spectral power of the light at a wavelength between 600-700 nm may be in the range of about 2.2-3.0 times a spectral power of the light at a wavelength between 400-500 nm, and a spectral power of the light at a wavelength between 600-700 nm may be in the range of about 2.5-3.0 times a spectral power of the light at a wavelength between 400-500 nm. In some cases, a photosynthetic photon flux (PPF) of the light at a wavelength between 600-700 nm may be in the range of about 3.5-4.5 times a PPF of the light at a wavelength between 400-500 nm, and a PPF of the light at a wavelength between 600-700 nm is in the range of about 3.8-4.2 times a PPF of the light at a wavelength between 400-500 nm. Numerous configurations and variations will be apparent in light of this disclosure.

General Overview

Horticulture has been an integral part of human society for a very long time. From a residential perspective, horticulture serves to satisfy the aesthetic cravings of the human mind to see beautiful foliage and flowers with a wide gamut of colors. It also addresses the desire of many people to grow delicious vegetables and fruits for consumption. From a commercial viewpoint, the strong need to feed the growing population of the world through commercial farming of plants and vegetables is an issue of global proportions and even national security. Furthermore, the farming of special plants for medicinal purposes is taking on an ever-increasing importance, particularly in the U.S. Currently, the medicinal focus is on growth of certain plants, for example, to manage pain after cancer chemotherapy or pain due to severe arthritis related ailments.

In nature, sunlight is the primary source of light energy for plant growth. The photons in the visible spectrum of sunlight that range in wavelength from about 400-700 nm stimulate pigments (e.g., Chlorophyll A and Chlorophyll B) in plants. This is necessary for optimum photosynthesis in plants, which leads to the production of vital sugars in the presence of carbon dioxide ($CO_2$) and water ($H_2O$). Without photosynthesis, there cannot be plant growth, and thus light is essential for the growth of plants.

Numerous incandescent, high-intensity discharge (HID), and fluorescent lighting sources for plant growth exist. However, each of these existing artificial lighting options is not without significant drawbacks. For instance, incandescent sources are very energy inefficient (i.e., a very small portion of the input electrical energy is converted into visible photons) and generate a lot of undesirable heat, requiring them to be sufficiently distanced from the plants to avoid plant damage, which further lowers their effectiveness. HID lamp sources also generate heat and are deficient in the blue portion (400-500 nm) of the spectrum that typically stimulates Chlorophyll B pigments in the plant, which is particularly important for photosynthesis in young plants, and helps with $CO_2$ gas exchange. Although fluorescent sources generate less undesirable heat than incandescent and HID sources, they contain the hazardous material mercury, and thus use of fluorescent sources near plants and disposal of such sources are an issue.

Figure 1:
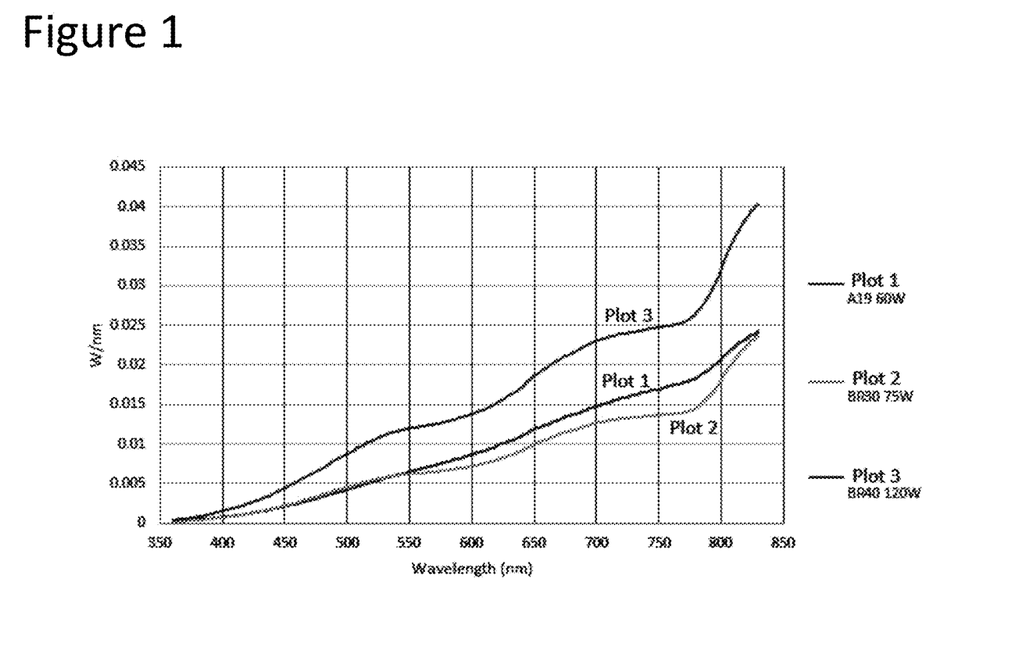
FIG. 1 is a graph of the spectral power distribution (SPD) of an existing incandescent horticultural lamp.
Figure 2:
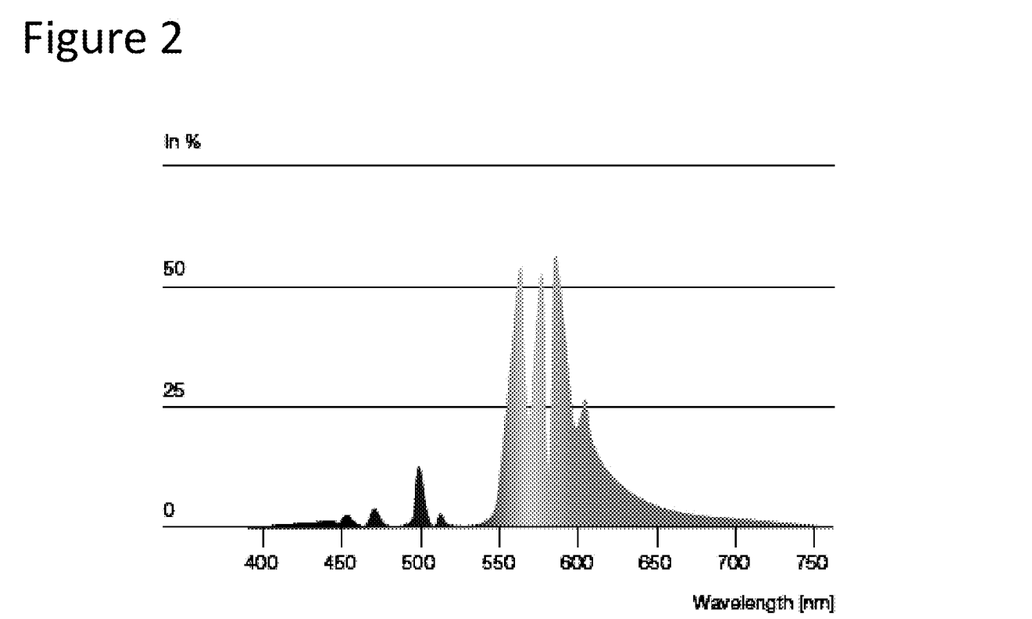
FIG. 2 is a graph of the SPD of an existing high-pressure sodium high-intensity discharge (HID) lamp.
Figure 3A:
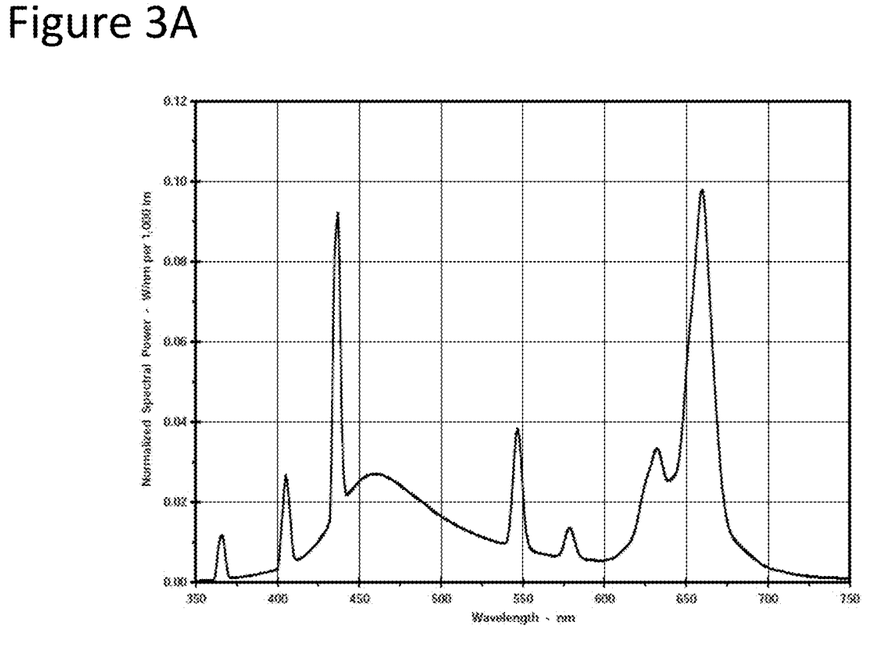
FIG. 3A is a graph of the SPD of an existing fluorescent horticultural lamp.
Figure 3B:
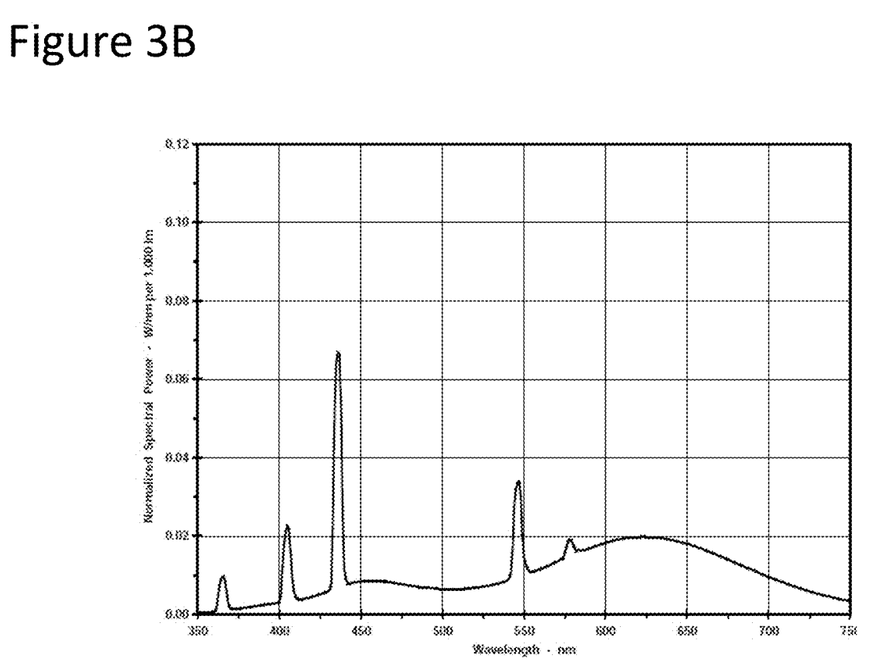
FIG. 3B is a graph of the SPD of another existing fluorescent horticultural lamp.

Of further concern, the spectral power distribution (SPD) of a horticultural lamp plays a major part in the effectiveness of the photosynthesis process, which is key to plant growth. The shape of the lamp spectrum over the different wavelengths, the relative intensity of the SPD at different wavelengths, and the relative spectral power in the blue, green, and red regions of the spectrum are all important parameters that influence the development of plants over their growth cycle. FIG. 1 is a graph of the SPD of an existing incandescent horticultural lamp. FIG. 2 is a graph of the SPD of an existing high-pressure sodium HID lamp. FIG. 3A is a graph of the SPD of an existing fluorescent horticultural lamp. FIG. 3B is a graph of the SPD of another existing fluorescent horticultural lamp. Moreover, although lumens are important for general illumination lamps, plants do not respond the way human eyes respond to light. As such, instead of luminous flux or lumens, it is the photosynthetic photon flux (PPF) that is of greater importance for plants. Therefore, the photosynthetic photon flux of the spectrum of emitted light is another important parameter that influences the development of plants over their growth cycle.

Thus, and in accordance with some embodiments of the present disclosure, a solid-state horticultural lamp is disclosed. In accordance with some embodiments, a lamp provided as described herein may be configured to emit a spectrum of light including: (1) a first local emission peak at a wavelength between 400-500 nm and having a first spectral power distribution (SPD) intensity; (2) a second local emission peak at a wavelength between 500-600 nm and having a second SPD intensity; and (3) a third local emission peak at a wavelength between 600-700 nm and having a third SPD intensity. In some cases, the second SPD intensity normalized to the first SPD intensity may be in the range of about 0.15-0.35. In some cases, the third SPD intensity normalized to the first spectral power distribution intensity may be in the range of about 2.4-2.8. In some instances, a spectral power of the light at a wavelength between 600-700 nm may be in the range of about 2.2-3.0 times a spectral power of the light at a wavelength between 400-500 nm. In some instances, a spectral power of the light at a wavelength between 600-700 nm may be in the range of about 2.5-3.0 times a spectral power of the light at a wavelength between 400-500 nm. In some cases, a photosynthetic photon flux (PPF) of the light at a wavelength between 600-700 nm may be in the range of about 3.5-4.5 times a PPF of the light at a wavelength between 400-500 nm. In some cases, a PPF of the light at a wavelength between 600-700 nm is in the range of about 3.8-4.2 times a PPF of the light at a wavelength between 400-500 nm. As such, a lamp configured as provided herein may be characterized by an SPD and thus a PPF that are particularly well-suited for horticultural applications and have distinctly different emissions characteristics as compared to existing horticultural lamp designs.

As will be appreciated in light of this disclosure, the use of solid-state light sources (e.g., LEDs) for horticultural applications has several advantages compared to traditional incandescent, HID, and fluorescent light sources. For instance, in using solid-state emitters, a lamp configured as provided herein may be more energy efficient than existing designs, which may realize a reduction in electricity consumption and operation costs. Also, in using solid-state emitters, a lamp configured as provided herein may produce less heat than existing incandescent and HID light sources and thus can be placed much closer to plants than those traditional sources, thereby maximizing (or otherwise improving) the effectiveness of usage of the visible photons emitted by the lamp. Moreover, in using solid-state emitters, a lamp configured as provided herein may not require the use of hazardous materials, such as mercury, metal halides, or sodium, contrary to existing fluorescent light and HID light sources.

In accordance with some embodiments, a lamp provided as variously described herein may be configured to be operatively coupled with any of a wide range of luminaires. For instance, in some cases, the disclosed lamp may be compatible with a luminaire configured as a recessed light, a pendant light, a sconce, or the like, which may be mounted on or suspended from, for example, a ceiling, wall, floor, step, or other suitable surface, as will be apparent in light of this disclosure. In some cases, the disclosed lamp may be compatible with a luminaire configured as a free-standing lighting device, such as a desk lamp or torchière lamp. In some embodiments, the disclosed lamp may be compatible with a luminaire configured to be mounted, for example, on a drop ceiling tile (e.g., 1 ft.×1 ft., 2 ft.×2 ft., 2 ft.×4 ft., 4 ft.×4 ft., or larger) for installation in a drop ceiling grid. In some embodiments, the disclosed lamp may be compatible with a luminaire configured, for instance, to substitute for a drop ceiling tile in a drop ceiling grid. In some embodiments, the disclosed lamp may be compatible with a luminaire configured to be embedded, in part or in whole, into a given mounting surface (e.g., plastered into a ceiling, wall, or other structure). Numerous suitable configurations will be apparent in light of this disclosure.

Structure and Operation

Figure 4:
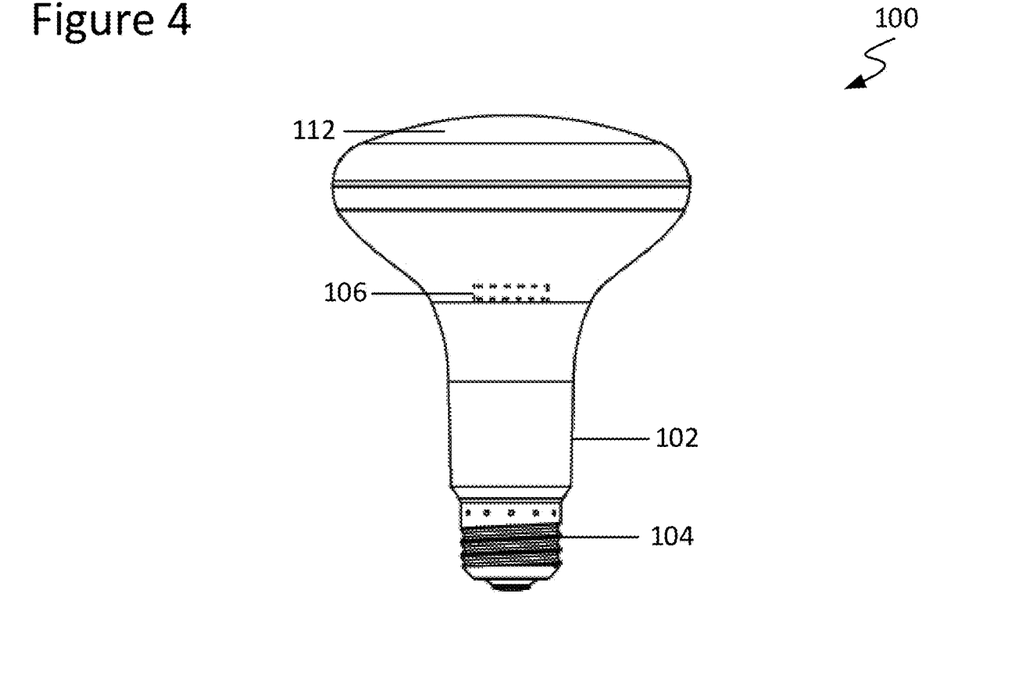
FIG. 4 illustrates an example solid-state lamp configured in accordance with an embodiment of the present disclosure.

FIG. 4 illustrates an example solid-state lamp 100 configured in accordance with an embodiment of the present disclosure. As can be seen, lamp 100 may include a body portion 102, the material, geometry, and dimensions of which may be customized, as desired for a given target application or end-use. Lamp 100 also may include a base portion 104 configured to be operatively coupled with a given power socket so that power may be delivered to lamp 100 for operation thereof. To that end, base portion 104 may be of any standard, custom, or proprietary contact type and fitting size, as desired for a given target application or end-use. In some cases, base portion 104 may be configured as a threaded lamp base including an electrical foot contact (e.g., an Edison-type screw base, such as in FIG. 4). In some other cases, base portion 104 may be configured as a bi-pin, tri-pin, or other multi-pin lamp base. In some other cases, base portion 104 may be configured as a twist-lock mount lamp base. In some other cases, base portion 104 may be configured as a bayonet connector lamp base. Other suitable configurations for body portion 102 and base portion 104 will depend on a given application and will be apparent in light of this disclosure.

As will be appreciated in light of this disclosure, a lamp 100 configured as variously described herein may be compatible with power sockets/enclosures typically used in existing luminaire structures. For example, some embodiments may be of a PAR20, PAR30, PAR38, or other parabolic aluminized reflector (PAR) configuration. Some embodiments may be of a BR30, BR40, or other bulged reflector (BR) configuration. Some embodiments may be of an A19, A21, or other A-line configuration. Some embodiments may be of a T5, T8, or other tube configuration. In accordance with some embodiments, a lamp 100 configured as variously described herein may be considered, in a general sense, a retrofit or other drop-in replacement lighting component. As will be further appreciated in light of this disclosure, the particular configuration of a lamp 100 may be customized, for instance, to provide a given amount of photosynthetic photon flux (PPF) desired for a given horticultural or other target application or end-use.

Figure 5:
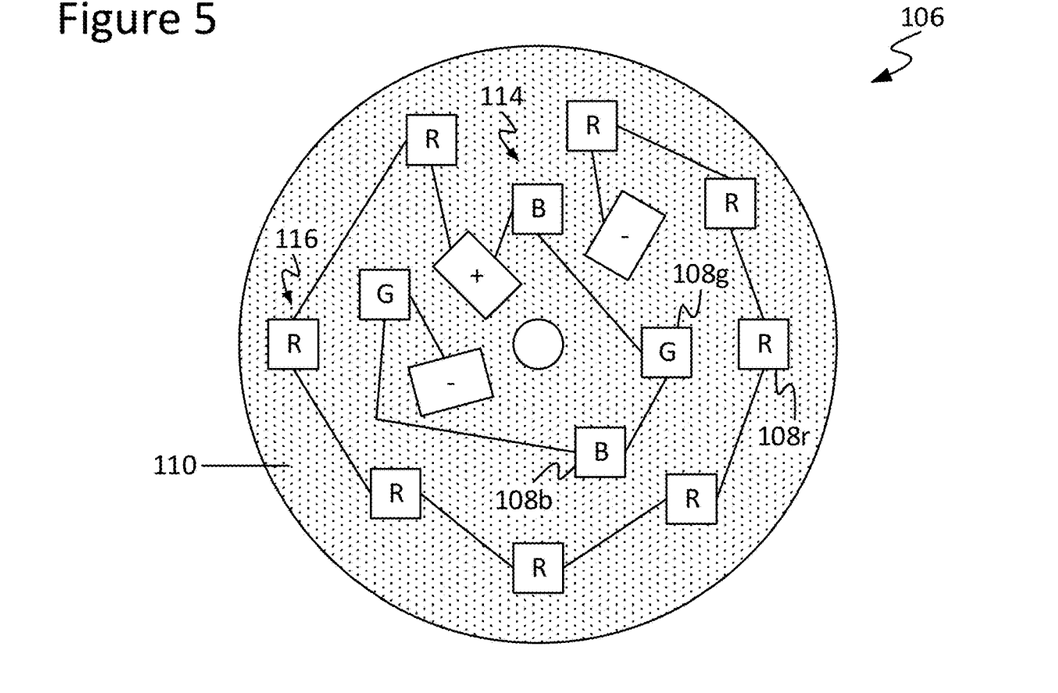
FIG. 5 illustrates a plan view of a light source module configured in accordance with an embodiment of the present disclosure.

In accordance with some embodiments, lamp 100 may include one or more light source modules 106. FIG. 5 illustrates a plan view of a light source module 106 configured in accordance with an embodiment of the present disclosure. As can be seen, light source module 106 may include one or more solid-state emitters 108 populated over a printed circuit board (PCB) 110 (e.g., a metal-core PCB) or other suitable intermediate or substrate. A description of emitters 108 and PCB 110 now follows.

In accordance with some embodiments, a given emitter 108 may be a semiconductor light source, such as a light-emitting diode (LED), an organic light-emitting diode (OLED), or a polymer light-emitting diode (PLED), among others. Regarding output, a given emitter 108 may be configured to emit electromagnetic radiation (e.g., light) from any one, or combination, of spectral bands, such as, for example, the visible spectral band, the infrared (IR) spectral band, and the ultraviolet (UV) spectral band, among others.

In accordance with some embodiments, light source module 106 may include one or more emitters 108*b* configured to emit light having wavelength(s) in the range of about 400-500 nm (e.g., generally blue light). In some such cases, a given emitter 108*b* may be configured to emit light having a local emission peak at a wavelength between 440-460 nm.

In accordance with some embodiments, light source module 106 may include one or more emitters 108*g* configured to emit light having wavelength(s) in the range of about 500-600 nm (e.g., generally green light). In some such cases, a given emitter 108*g* may be configured to emit light having a local emission peak at a wavelength between 520-550 nm.

In accordance with some embodiments, light source module 106 may include one or more emitters 108*r* configured to emit light having wavelength(s) in the range of about 600-700 nm (e.g., generally red light). In some such cases, a given emitter 108*r* may be configured to emit light having a local emission peak at a wavelength between 630-680 nm.

A given emitter 108 may be configured for emissions of a single correlated color temperature (CCT) or for color-tunable emissions, as desired. Thus, and in accordance with some embodiments, a given emitter 108 may be configured to emit any one, or combination, of blue, green, and red light. Also, the electrical power (wattage) of a given emitter 108 may be customized, as desired for a given target application or end-use. In some cases, a given emitter 108 may be a low-power semiconductor light source having a wattage of about 1 W or less (e.g., about 0.25 W or less, about 0.5 W or less, about 0.75 W or less, or any other sub-range in the range of about 1 W or less). In some cases, a given emitter 108 may be a high-power semiconductor light source having a wattage of about 1 W or greater (e.g., about 1.25 W or greater, about 1.5 W or greater, or any other sub-range in the range of about 1 W or greater). Other suitable configurations for emitters 108 will depend on a given application and will be apparent in light of this disclosure.

A given emitter 108 may be electrically coupled with PCB 110 via any suitable standard, custom, or proprietary electrical coupling means, such as, for example, solder pads on a metal-core PCB, where the emitters 108 are reflow soldered onto PCB 110 (optionally with one or more intervening layers). In some cases, PCB 110 further may include other componentry populated there over, such as, for example, resistors, transistors, capacitors, integrated circuits, and power and control connections for a given emitter 108, to name a few examples. All (or some sub-set) of emitters 108 of light source module 106 may be operatively coupled in series or in parallel (or a combination of both), as desired for a given target application or end-use.

The arrangement of emitters 108 over PCB 110 may be customized, as desired for a given target application or end-use. For instance, in some embodiments, emitters 108 may be distributed, in part or in whole, as a regular array in which all (or some sub-set) of emitters 108 are arranged in a systematic manner in relation to one another over PCB 110. In some other embodiments, emitters 108 may be distributed, in part or in whole, as a semi-regular array in which a sub-set of emitters 108 are arranged in a systematic manner in relation to one another over PCB 110, but at least one other emitter 108 is not so arranged. In some other embodiments, emitters 108 may be distributed, in part or in whole, as an irregular array in which all (or some sub-set) of emitters 108 are not arranged in a systematic manner in relation to one another over PCB 110.

In accordance with some embodiments, emitters 108 of light source module 106 may be arranged in a single string or in multiple (e.g., two or more) strings. For instance, the example embodiment shown in FIG. 5 includes a first string 114 of emitters 108 and a separate second string 116 of emitters 108. In some cases, for a given string 114, 116, all the constituent emitters 108 may be configured to emit only the same single light color (e.g., red, green, or blue). In some other cases, for a given string 114, 116, one sub-set of the constituent emitters 108 may be configured to emit a first light color, whereas a second sub-set may be configured to emit a different second light color (e.g., red and blue; red and green; green and blue). The quantity, density, and spacing between neighboring emitters 108 over PCB 110 may be customized, as desired for a given target application or end-use.

In accordance with some embodiments, such as the example embodiment shown in FIG. 5, light source module 106 may include: (1) a first sub-set of emitters 108*b* configured to emit light of a first sub-set of wavelengths (e.g., blue light); (2) a second sub-set of emitters 108*g* configured to emit light of a different second sub-set of wavelengths (e.g., green light); and (3) a third sub-set of emitters 108*r* configured to emit light of a different third sub-set of wavelengths (e.g., red light). Also, as shown in this example embodiment, the first sub-set of emitters 108*b* and the second sub-set of emitters 108*g* may be constituents of a first string 114 of emitters 108, and the third sub-set of emitters 108*r* may be constituents of a different second string 116 of emitters 108. In at least one example embodiment, first string 114 includes two blue emitters 108*b* and two green emitters 108*g*, and second string includes eight red emitters 108*r*. Of course, the quantity, density, and spacing between neighboring emitters 108 for a given string 114, 116 may be customized. Also, the quantity of emitters 108 of each color (e.g., blue emitters 108*b*; green emitters 108*g*; red emitters 108*r*) may be customized. In addition, the electrical power (wattage) of each individual emitter 108 may be customized to achieve a given desired SPD, and the present disclosure is not intended to be limited only to the example configuration depicted via FIG. 5. In cases where multiple strings (e.g., a first string 114 and a second string 116) are utilized, the forward voltage of the individual emitters 108 may be selected to have the desired voltage difference between strings 114, 116, in accordance with some embodiments. Numerous configurations and variations will be apparent in light of this disclosure.

In accordance with some embodiments, lamp 100 also may include one or more optics 112, which may have any of a wide range of configurations. A given optic 112 may be configured to transmit, in part or in whole, emissions received from a given emitter 108 optically coupled therewith, in accordance with some embodiments. A given optic 112 may be configured, in accordance with some embodiments, for increasing and/or decreasing the output beam angle. A given optic 112 may be formed from any one, or combination, of suitable optical materials. For instance, in some embodiments, a given optic 112 may be formed from a polymer, such as poly(methyl methacrylate) (PMMA) or polycarbonate, among others. In some embodiments, a given optic 112 may be formed from a ceramic, such as sapphire ($Al_2O_3$) or yttrium aluminum garnet (YAG), among others. In some embodiments, a given optic 112 may be formed from a glass. In some embodiments, a given optic 112 may be formed from a combination of any of the aforementioned materials. Furthermore, the dimensions and geometry of a given optic 112 may be customized, as desired for a given target application or end-use.

In some embodiments, a given optic 112 may be or otherwise include a lens, such as a Fresnel lens, a converging lens, a compound lens, or a micro-lens array, to name a few. In some embodiments, a given optic 112 may be or otherwise include an optical dome or optical window. In some cases, a given optic 112 may be formed as a singular piece of optical material, providing a monolithic optical structure. In some other cases, a given optic 112 may be formed from multiple pieces of optical material, providing a polylithic (multi-piece) optical structure. In some instances, a given optic 112 may be configured to filter light transmitted therethrough. Other suitable configurations for optic(s) 112 will depend on a given application and will be apparent in light of this disclosure.

As will be appreciated in light of this disclosure, lamp 100 further may include or otherwise have access to any of a wide range of other electronic components employable with solid-state lamps and luminaires. For instance, in some embodiments, lamp 100 may include or otherwise have access to power conversion componentry, such as electrical ballast circuitry, configured to convert an AC signal into a DC signal at a desired current/voltage to power a given light source module 106. In some instances, lamp 100 may include self-ballasted electronics (e.g., disposed within base portion 104 or other portion of lamp 100). In some embodiments, lamp 100 may include or otherwise have access to constant current/voltage driver componentry. In some embodiments, lamp 100 may include or otherwise have access to communication componentry (e.g., such as a transmitter, a receiver, or a transceiver) configured for wired or wireless communication (or both) utilizing any suitable means, such as Universal Serial Bus (USB), Ethernet, FireWire, Wi-Fi, Bluetooth, ZigBee, or a combination thereof, among others. In some embodiments, lamp 100 may include or otherwise have access to processing componentry, such as a central processing unit (CPU) or a microcontroller unit (MCU), among others.

In accordance with some embodiments, lamp 100 may include or otherwise have access to one or more drivers configured to be operatively coupled with emitters 108. In some cases, a given driver may be native to lamp 100 (e.g., disposed within body portion 102 or other portion of lamp 100) or native to a given emitter 108, whereas in some other cases, a given driver may be native to a luminaire configured to be operatively coupled with lamp 100. A given driver may be a single-channel or multi-channel electronic driver and, in some cases, may be a high-current driver. In accordance with some embodiments, a given driver may be configured to drive a given emitter 108 utilizing any suitable standard, custom, or proprietary driving techniques. In some cases, lamp 100 may include or otherwise have access to a driver configured to provide for electronic adjustment, for example, of the PPF, spectral power, spectral intensity, ratio of PPF, spectral power and spectral intensity in the blue, green, and/or red regions, or a combination of any one or more thereof, as desired for a given target application or end-use. Other suitable driver configurations will depend on a given application and will be apparent in light of this disclosure.

In accordance with some embodiments, lamp 100 may include or otherwise have access to one or more controllers configured to be operatively coupled with emitters 108. In some cases, a given controller may be native to lamp 100 (e.g., disposed within body portion 102 or other portion of lamp 100) or native to a given emitter 108, whereas in some other cases, a given controller may be native to a luminaire configured to be operatively coupled with lamp 100. The emitters 108 of lamp 100 may be electronically controlled to provide lamp 100 with highly adjustable light emissions, in accordance with some embodiments. A given controller may host one or more lighting control modules and may be programmed or otherwise configured to output one or more control signals that may be utilized in controlling the operation of a given emitter 108 of lamp 100, in accordance with some embodiments. For instance, in some embodiments, a given controller may include an intensity adjustment module and may be configured to output control signal(s) to control the intensity (e.g., brightness or dimness) of the light emitted by a given emitter 108. In some embodiments, a given controller may include a color adjustment module and may be configured to output control signal(s) to control the color (e.g., wavelength) of the light emitted by a given emitter 108. In some embodiments, a given controller may be configured to output control signal(s) for use in controlling whether a given emitter 108 is in an on state or an off state. It should be noted, however, that the present disclosure is not intended to be limited only to these example lighting control modules and output signals. Additional and/or different lighting control modules and output signals may be provisioned, as desired for a given target application or end-use. Numerous variations and configurations will be apparent in light of this disclosure.

In accordance with some embodiments, the module(s) of a given controller can be implemented in any suitable standard, custom, or proprietary programming language, such as, for example, C, C++, objective C, JavaScript, or any other suitable instruction set, as will be apparent in light of this disclosure. The module(s) of a given controller can be encoded, for example, on a machine-readable medium that, when executed by a processor, carries out the functionality of lamp 100, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and a number of embedded routines for carrying out device functionality. In a more general sense, the functional modules of a given controller can be implemented in any one, or combination, of hardware, software, and firmware, as desired for a given target application or end-use.

Example Output Performance

Figure 6A:
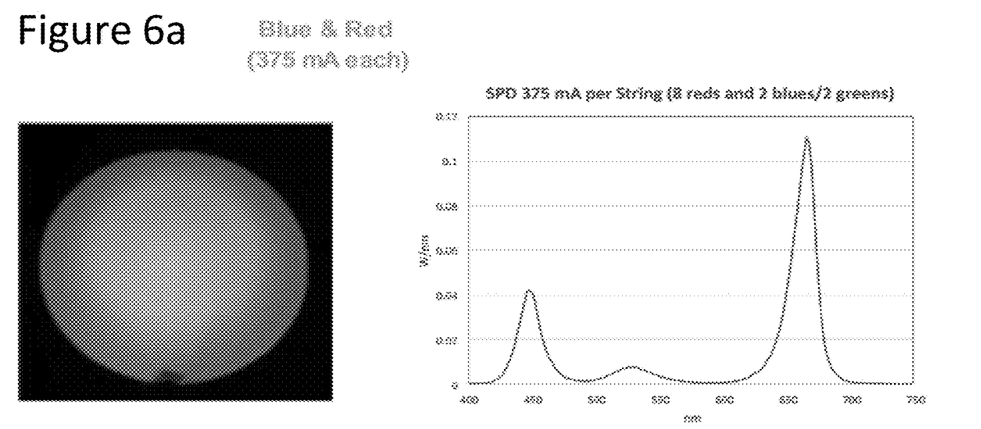
FIG. 6a illustrates an example composite blue, green, and red light output and related emissions spectrum of a light source module configured in accordance with an embodiment of the present disclosure.

In some embodiments, light source module 106 may be configured such that all its emitters 108, or at least one of each type of emitter 108 (e.g., blue emitters 108*b*, green emitters 108g, and red emitters 108r), may be activated to emit simultaneously. Thus, light source module 106 can be operated to emit a blend of blue, green, and red light; for instance, consider FIG. 6a, which illustrates an example composite blue, green, and red light output and related emissions spectrum of a light source module 106 configured in accordance with an embodiment of the present disclosure.

Figure 6B:
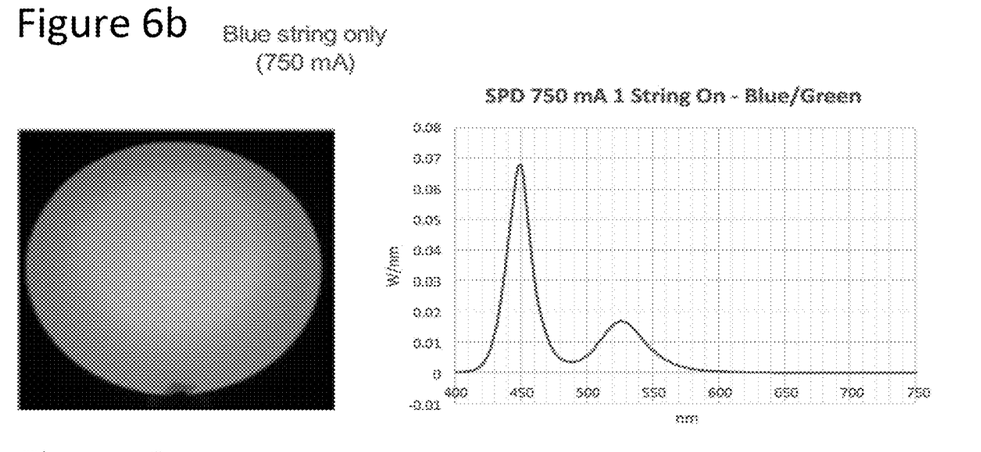
FIG. 6b illustrates an example composite blue and green light output and related emissions spectrum of a light source module configured in accordance with an embodiment of the present disclosure.
Figure 6C:
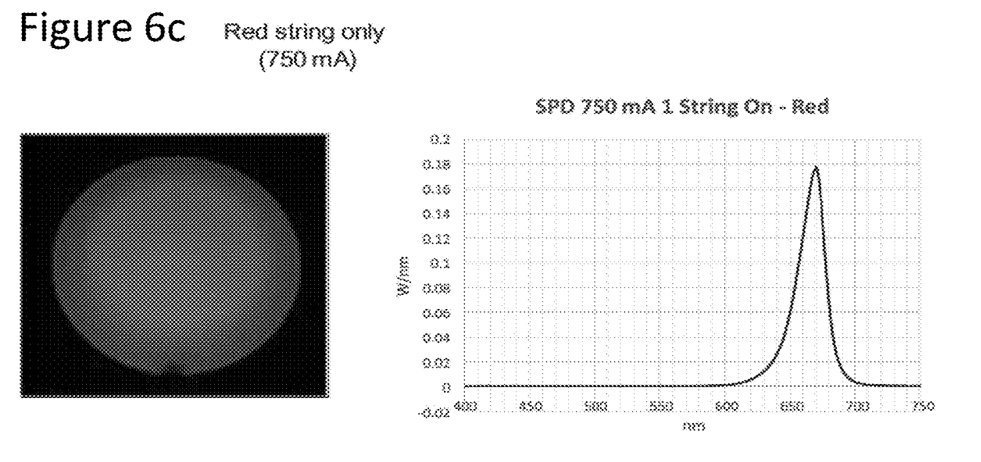
FIG. 6c illustrates an example red light output and related emissions spectrum of a light source module configured in accordance with an embodiment of the present disclosure.

However, the present disclosure is not intended to be so limited, as in accordance with some embodiments, light source module 106 may be configured such that only one or more sub-sets of emitters 108 may be activated at a time. For example, in some embodiments, light source module 106 can be operated to emit only blue, green, or a blend of blue and green light; for instance, consider FIG. 6b, which illustrates an example composite blue and green light output and related emissions spectrum of a light source module 106 configured in accordance with an embodiment of the present disclosure. To this end, a first string 114 of only blue emitters 108b and green emitters 108g may be activated, in accordance with some embodiments. In some embodiments, light source module 106 can be operated to emit only red light; for instance, consider FIG. 6c, which illustrates an example red light output and related emissions spectrum of a light source module 106 configured in accordance with an embodiment of the present disclosure. To this end, a second string 116 of only red emitters 108r may be activated, in accordance with some embodiments.

As will be appreciated in light of this disclosure, humans and plants do not view light in the same way, and so there are some key differences between general illumination lamps (i.e., lamps generally used to light various portions of a home or other space) and horticultural lamps (i.e., lamps generally used to promote the growth of plants). For instance, for human vision, eye sensitivity photopic response is key, and therefore lumens are the parameter of choice for determining the luminous flux of general illumination lamps. Plants, however, do not view light as the human eye does, and thus lumens are not especially important in the design of horticultural lamps. Rather, horticultural lamps are better characterized by the parameter of photosynthetic photon flux (PPF). The unit of measurement for PPF is μmol photons/s, the photons being at the wavelength at which the PPF value is calculated.

The PPF of a horticultural lamp can be calculated from its SPD. For illustrative purposes, consider the 400-700 nm spectral region as consisting of: (1) a blue light sub-region covering from about 400-500 nm; (2) a green light sub-region covering from about 500-600 nm; and (3) a red light sub-region covering from about 600-700 nm. For purposes of explaining the PPF calculation process, let us select the blue light sub-region (400-500 nm). Typically, the SPD of lamps is gathered in 1 nm or 2 nm increments. For the example below, assume 1 nm spacing for the SPD data, where the spectral power is expressed in W/nm.

To determine the PPF from the SPD of a horticultural lamp, choose a 1 nm wavelength region (e.g., 400-441 nm in the blue light sub-region) and do each of the following. First, calculate the photon energy (in kJ/mol), which is the product of the energy of the photon (J/photon) times Avogadro's constant divided by 1,000. The photon energy is the product of Planck's constant and the photon frequency. The photon frequency is calculated by dividing the velocity of light by the known wavelength of the photon. Second, calculate the spectral power (in W) by taking the product of the SPD (in W/nm) from the SPD data times the wavelength domain, which is 1 nm if the data spacing is 1 nm. Third, calculate the PPF (in μmol photons/s) for this small portion, 440-441 nm, of the blue light spectrum by dividing the spectral power (in W) by the photon energy (in kJ/mol) and multiplying by 1,000. Then, repeat this for each of the portions of the blue light spectrum, increasing by 1 nm from 400-500 nm, and add up the individual PPFs to calculate a composite PPF for all the blue photons between 400-500 nm. The same process may be utilized for the green light sub-region (500-600 nm) and the red light sub-region (600-700 nm) as well, if desired.

Figure 7:
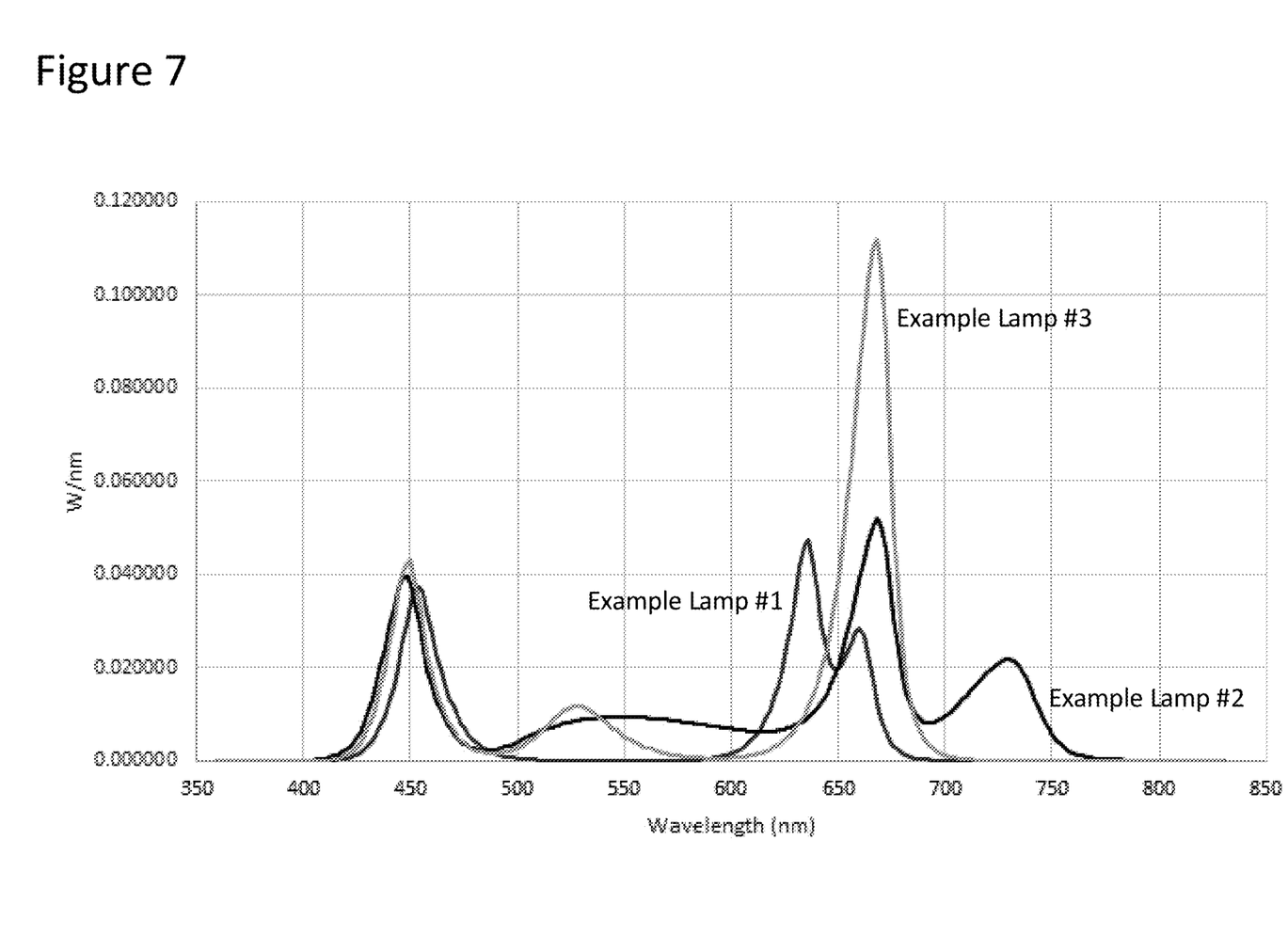
FIG. 7 is a graph comparing the SPD of two existing horticultural lamps with the SPD of one example lamp configured in accordance with an embodiment of the present disclosure.

FIG. 7 is a graph comparing the SPD of two existing horticultural lamps with the SPD of one lamp 100 configured in accordance with an embodiment of the present disclosure. More specifically, Example Lamps #1 and #2 are commercially available LED-based lamps marketed for promoting plant growth. Example Lamp #3 is a solid-state lamp 100 configured in accordance with an example embodiment of the present disclosure. The SPD quantifies the spectral emission (in W/nm) on the y-axis as a function of the emission wavelength (in nm) on the x-axis. Moreover, for this comparison, it should be noted that, the SPD of Example Lamp #3 is achieved by using a combination of emitters 108b configured to emit blue light, emitters 108g configured to emit green light, and emitters 108r configured to emit red light.

As can be seen in comparing the three plotted spectra of FIG. 7, each of Example Lamps #1, #2, and #3 have: (1) local emission peaks in the 400-500 nm blue region; and (2) local emission peaks in the 600-700 nm red region. With Example Lamp #1, however, there is no emission in the 500-600 nm green region, let alone a local emission peak thereat. Also, with Example Lamp #2, there is no local emission peak in the 500-600 nm region; rather, there is only a very broad band emission in that region.

Unlike Example Lamps #1 and #2, Example Lamp #3 has a distinct local emission peak in the 500-600 nm green region, more specifically, in the 500-550 nm region, and even more specifically in the 528-546 nm region. Although the chlorophyll in plants does not absorb green light, green photons serve certain important plant functions, including control of the exchange of $CO_2$, which is important for the photosynthesis process. Thus, Example Lamp #3 (i.e., the lamp 100 configured in accordance with an embodiment of the present disclosure) has a distinct advantage compared to Example Lamps #1 and #2 in that its SPD possesses a distinct local emission peak in the 500-550 nm region. From a mathematical perspective, the SPD of Example Lamp #3 is such that, at this local emission peak in the green region, the first derivative $dy/dx$ is zero, and the second derivative $d^2y/dx^2<0$, where y refers to the SPD axis, and x refers to the nm axis. In addition, a comparison of the three spectra shows that, relative to Example Lamps #1 and #2, Example Lamp #3 has the highest intensity of the local red peak (600-700 nm) relative to the local blue peak (400-500 nm).

Table 1 below lists the SPD local peak intensities for each of Example Lamps #1, #2, and #3 for the three regions of interest: (1) blue 400-500 nm; (2) green 500-600 nm; and (3) red 600-700 nm. Furthermore, Table 1 shows the intensities of the local peaks in the 500-600 nm and 600-700 nm ranges normalized to the blue peak intensity. For this comparison, it should be noted that the PPF numbers for the blue and red regions shown in Table 1 were obtained according to the PPF calculation methodology discussed above.

TABLE 1

|  | Blue Peak | Green Peak | Red Peak 1 | Red Peak 2 |
|---|---|---|---|---|
| Example Lamp #1 Wavelength | 454 nm | No local peak | 636 nm | 660 nm |
| Intensity (W/nm) | 0.037418 | N/A | 0.047358 | 0.028491 |
| Normalized Intensity | 1.00 | N/A | 1.27 | 0.76 |

TABLE 1-continued

|  | Blue Peak | Green Peak | Red Peak 1 | Red Peak 2 |
|---|---|---|---|---|
| Example Lamp #2 Wavelength | 448 nm | Broad; No local Peak | 668 nm | 730 nm (IR) |
| Intensity (W/nm) | 0.039666 | N/A | 0.052000 | 0.021864 |
| Normalized Intensity | 1.00 | N/A | 1.31 | 0.55 |
| Example Lamp #3 Wavelength | 450 nm | 528 nm | 668 nm | N/A |
| Intensity (W/nm) | 0.043125 | 0.011811 | 0.111831 | N/A |
| Normalized Intensity | 1.00 | 0.27 | 2.59 | N/A |

Table 1 above shows that the normalized SPD intensity of the red peak in the 600-700 nm region relative to the blue peak in the 400-500 nm region is: (1) 1.27 for Example Lamp #1 at 636 nm; (2) 1.31 for Example Lamp #2; and (3) 2.59 for Example Lamp #3. Although Example Lamp #1 has a second local red peak in the 600-700 nm region, the normalized intensity of this second red peak at 664 nm is 0.76, which is lower than the normalized intensity of 1.27 of the first red peak at 636 nm. Example Lamp #3 (i.e., the lamp 100 configured in accordance with an embodiment of the present disclosure) has the highest local emission in the red region relative to the blue, at least twice that of Example Lamps #1 and #2. As previously noted, red light is important from a vegetative, flowering, and fruiting perspective for plants. Thus, as compared to existing approaches, Example Lamp #3 has a SPD having characteristics in the red spectrum that are advantageously suited for flowering and fruiting of plants.

As previously noted, green light facilitates plant growth, and without it, some plants would grow to be abnormally purplish gray. Moreover, although the primary pigments of plants (Chlorophyll A and B) do not really absorb it, green light serves certain functions, including color preservation and stomato-control (which governs the exchange of $CO_2$ gas via leaves of the plant). Table 1 shows that for Example Lamp #3 (i.e., the lamp 100 configured in accordance with an embodiment of the present disclosure), the normalized SPD intensity of the local green peak in the 500-600 nm region relative to the local blue peak in the 400-500 nm region is about 0.27.

Table 2 below shows an additional analysis of the SPD to determine the spectral power (in W) and the PPF (in µmol photons/s) in the blue region (400-500 nm) and in the red region (600-700 nm). In addition, both the spectral power and the PPF in the red region have been normalized relative to the corresponding values in the blue region. For this comparison, it should be noted that the PPF numbers for the blue and red regions shown in Table 2 below were obtained according to the PPF calculation methodology discussed above.

TABLE 2

|  | Blue Spectral Power (W) 400-500 nm | Blue PPF (µmol photons/s) 400-500 nm | Red Spectral Power (W) 600-700 nm | Red PPF (µmol photons/s) 600-700 nm | R:B Spectral Power — | R:B PPF — |
|---|---|---|---|---|---|---|
| Example Lamp #1 | 0.961 | 3.659 | 1.519 | 8.153 | 1.580 | 2.228 |
| Example Lamp #2 | 1.096 | 4.124 | 1.783 | 9.828 | 1.626 | 2.383 |
| Example Lamp #3 | 1.064 | 4.011 | 2.859 | 15.826 | 2.688 | 3.946 |

Relative to Example Lamps #1 and #2, Example Lamp #3 (i.e., the lamp 100 configured in accordance with an embodiment of the present disclosure) has a detectably higher spectral power in the red compared to that in the blue. More specifically, the red-to-blue (R:B) spectral power ratio is about 2.7 for Example Lamp #3 compared to only 1.6 for Example Lamps #1 and #2. Also, relative to Example Lamps #1 and #2, Example Lamp #3 has a detectably higher PPF in the red compared to that in the blue. More specifically, the red-to-blue (R:B) PPF ratio is about 3.95 for Example Lamp #3 compared to only 2.3-2.4 for Example Lamps #1 and #2. Thus, Example Lamp #3 (i.e., the lamp 100 configured in accordance with an embodiment of the present disclosure) has distinctly higher red:blue spectral power ratio and distinctly higher red:blue PPF ratio than Example Lamps #1 and #2. This is due, at least in part, to the unique SPD of Example Lamp #3, which places it at an advantageous position relative to other existing lamps, for example, as regarding promotion of flowering and fruiting of plants.

More generally, in view of the comparative data discussed above, lamp 100 may be configured, in accordance with some embodiments, to emit a spectrum of light comprising: (1) a first local emission peak at a wavelength between 400-500 nm and having a first spectral power distribution intensity; (2) a second local emission peak at a wavelength between 500-600 nm and having a second spectral power distribution intensity; and (3) a third local emission peak at a wavelength between 600-700 nm and having a third spectral power distribution intensity. The second spectral power distribution intensity normalized to the first spectral power distribution intensity may be, for example, in the range of about 0.15-0.35. The third spectral power distribution intensity normalized to the first spectral power distribution intensity may be, for example, in the range of about 2.4-2.8. At least in some instances, the first local emission peak may be at a wavelength between 440-460 nm, the second local emission peak may be at a wavelength between 520-550 nm, and the third local emission peak may be at a wavelength between 630-680 nm.

As can be derived further from the comparative data discussed above, lamp 100 may be configured, in accordance with some embodiments, such that a spectral power of the light at a wavelength between 600-700 nm is in the range of about 2.2-3.0 times a spectral power of the light at a wavelength between 400-500 nm. In accordance with some embodiments, lamp 100 may be configured such that a spectral power of the light at a wavelength between 600-700 nm is in the range of about 2.5-3.0 times a spectral power of the light at a wavelength between 400-500 nm. In some embodiments, lamp 100 may be configured such that a PPF of the light at a wavelength between 600-700 nm is in the range of about 3.5-4.5 times a PPF of the light at a wavelength between 400-500 nm. In some embodiments, lamp 100 may be configured such that a PPF of the light at a wavelength between 600-700 nm is in the range of about 3.8-4.2 times a PPF of the light at a wavelength between 400-500 nm. As will be appreciated in light of this disclosure, SPD and PPF values of these magnitudes may make lamp 100, at least in some instances, particularly well-suited for stimulating any one, or combination, of stem growth, foliage growth, flower growth, and fruit growth for a given plant receiving light therefrom.

Numerous embodiments will be apparent in light of this disclosure. One example embodiment provides a solid-state lamp including: a printed circuit board (PCB); and a plurality of solid-state emitters populated over the PCB and configured to emit a spectrum of light including: a first local emission peak at a wavelength between 400-500 nm and having a first spectral power distribution intensity; a second local emission peak at a wavelength between 500-600 nm and having a second spectral power distribution intensity; and a third local emission peak at a wavelength between 600-700 nm and having a third spectral power distribution intensity; wherein: the second spectral power distribution intensity normalized to the first spectral power distribution intensity is in the range of about 0.15-0.35; and the third spectral power distribution intensity normalized to the first spectral power distribution intensity is in the range of about 2.4-2.8. In some cases, the first local emission peak is at a wavelength between 440-460 nm. In some instances, the second local emission peak is at a wavelength between 520-550 nm. In some cases, the third local emission peak is at a wavelength between 630-680 nm. In some instances, the first local emission peak is at a wavelength between 440-460 nm; the second local emission peak is at a wavelength between 520-550 nm; and the third local emission peak is at a wavelength between 630-680 nm. In some cases, a spectral power of the light at a wavelength between 600-700 nm is in the range of about 2.2-3.0 times a spectral power of the light at a wavelength between 400-500 nm. In some instances, a spectral power of the light at a wavelength between 600-700 nm is in the range of about 2.5-3.0 times a spectral power of the light at a wavelength between 400-500 nm. In some cases, a photosynthetic photon flux of the light at a wavelength between 600-700 nm is in the range of about 3.5-4.5 times a photosynthetic photon flux of the light at a wavelength between 400-500 nm. In some instances, a photosynthetic photon flux of the light at a wavelength between 600-700 nm is in the range of about 3.8-4.2 times a photosynthetic photon flux of the light at a wavelength between 400-500 nm. In some cases, the plurality of solid-state emitters includes: a first sub-set of solid-state emitters configured to emit light of a wavelength in the range of 400-500 nm; a second sub-set of solid-state emitters configured to emit light of a wavelength in the range of 500-600 nm; and a third sub-set of solid-state emitters configured to emit light of a wavelength in the range of 600-700 nm. In some such cases, the first sub-set of solid-state emitters and the second sub-set of solid-state emitters are operatively coupled in series; and the third sub-set of solid-state emitters is operatively coupled in series. In some other such cases, the first sub-set of solid-state emitters includes two solid-state emitters; the second sub-set of solid-state emitters includes two solid-state emitters; and the third sub-set of solid-state emitters includes eight solid-state emitters. In some instances, the solid-state lamp is configured as at least one of a BR40 lamp, a BR30 lamp, a PAR38 lamp, a PAR30 lamp, a PAR20 lamp, an A19 lamp, an A21 lamp, a T5 lamp, and a T8 lamp.

Another example embodiment provides a method of promoting plant growth via a solid-state lamp, the method including: emitting, via a first solid-state emitter of the solid-state lamp, light including a first local emission peak at a wavelength between 400-500 nm and having a first spectral power distribution intensity; emitting, via a second solid-state emitter of the solid-state lamp, light including a second local emission peak at a wavelength between 500-600 nm and having a second spectral power distribution intensity, wherein the second spectral power distribution intensity normalized to the first spectral power distribution intensity is in the range of about 0.15-0.35; and emitting, via a third solid-state emitter of the solid-state lamp, light including a third local emission peak at a wavelength between 600-700 nm and having a third spectral power distribution intensity, wherein the third spectral power distribution intensity normalized to the first spectral power distribution intensity is in the range of about 2.4-2.8. In some cases, at least one of: a spectral power of the light at a wavelength between 600-700 nm is in the range of about 2.2-3.0 times a spectral power of the light at a wavelength between 400-500 nm; and a spectral power of the light at a wavelength between 600-700 nm is in the range of about 2.5-3.0 times a spectral power of the light at a wavelength between 400-500 nm. In some instances, at least one of: a photosynthetic photon flux of the light at a wavelength between 600-700 nm is in the range of about 3.5-4.5 times a photosynthetic photon flux of the light at a wavelength between 400-500 nm; and a photosynthetic photon flux of the light at a wavelength between 600-700 nm is in the range of about 3.8-4.2 times a photosynthetic photon flux of the light at a wavelength between 400-500 nm. In some cases, the first spectral power distribution intensity, the second spectral power distribution intensity, and the third spectral power distribution intensity are of sufficient magnitude to stimulate at least one of stem growth, foliage growth, flower growth, and fruit growth.

Another example embodiment provides a solid-state lamp including: a first plurality of solid-state emitters electrically coupled in series and configured to emit light of a wavelength between 400-500 nm and characterized by a first local emission peak at a wavelength between 440-460 nm; a second plurality of solid-state emitters electrically coupled in series and configured to emit light of a wavelength between 500-600 nm and characterized by a second local emission peak at a wavelength between 520-550 nm; and a third plurality of solid-state emitters electrically coupled in series and configured to emit light of a wavelength between 600-700 nm and characterized by a third local emission peak at a wavelength between 630-680 nm; wherein: a photosynthetic photon flux of the light at a wavelength between 600-700 nm is in the range of about 3.5-4.5 times a photosynthetic photon flux of the light at a wavelength between 400-500 nm; and a photosynthetic photon flux of the light at a wavelength between 600-700 nm is in the range of about 3.8-4.2 times a photosynthetic photon flux of the light at a wavelength between 400-500 nm. In some cases, the solid-state lamp is self-ballasted. In some instances, a lighting system is provided, the lighting system including: a solid-state lamp configured as provided herein; and a luminaire configured to be operatively coupled with the solid-state lamp.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A solid-state lamp comprising:
   a printed circuit board (PCB); and
   a plurality of solid-state emitters populated over the PCB and configured to emit a spectrum of light comprising:
      a first local emission peak at a wavelength between 400-500 nm and having a first spectral power distribution intensity;
      a second local emission peak at a wavelength between 500-600 nm and having a second spectral power distribution intensity; and
      a third local emission peak at a wavelength between 600-700 nm and having a third spectral power distribution intensity;
   wherein:
      the first local emission peak is of greater amplitude than the second local emission peak;
      the third local emission peak is the only local emission peak at a wavelength between 600-700 nm;
      the second spectral power distribution intensity normalized to the first spectral power distribution intensity is in the range of about 0.15-0.35; and
      the third spectral power distribution intensity normalized to the first spectral power distribution intensity is in the range of about 2.4-2.8.

2. The solid-state lamp of claim 1, wherein the first local emission peak is at a wavelength between 440-460 nm.

3. The solid-state lamp of claim 1, wherein the second local emission peak is at a wavelength between 520-550 nm.

4. The solid-state lamp of claim 1, wherein the third local emission peak is at a wavelength between 630-680 nm.

5. The solid-state lamp of claim 1, wherein:
   the first local emission peak is at a wavelength between 440-460 nm;
   the second local emission peak is at a wavelength between 520-550 nm; and
   the third local emission peak is at a wavelength between 630-680 nm.

6. The solid-state lamp of claim 1, wherein a spectral power of the light at a wavelength between 600-700 nm is in the range of about 2.2-3.0 times a spectral power of the light at a wavelength between 400-500 nm.

7. The solid-state lamp of claim 1, wherein a spectral power of the light at a wavelength between 600-700 nm is in the range of about 2.5-3.0 times a spectral power of the light at a wavelength between 400-500 nm.

8. The solid-state lamp of claim 1, wherein a photosynthetic photon flux of the light at a wavelength between 600-700 nm is in the range of about 3.5-4.5 times a photosynthetic photon flux of the light at a wavelength between 400-500 nm.

9. The solid-state lamp of claim 1, wherein a photosynthetic photon flux of the light at a wavelength between 600-700 nm is in the range of about 3.8-4.2 times a photosynthetic photon flux of the light at a wavelength between 400-500 nm.

10. The solid-state lamp of claim 1, wherein the plurality of solid-state emitters comprises:
    a first sub-set of solid-state emitters configured to emit light of a wavelength in the range of 400-500 nm;
    a second sub-set of solid-state emitters configured to emit light of a wavelength in the range of 500-600 nm; and
    a third sub-set of solid-state emitters configured to emit light of a wavelength in the range of 600-700 nm.

11. The solid-state lamp of claim 10, wherein:
    the first sub-set of solid-state emitters and the second sub-set of solid-state emitters are operatively coupled in series; and
    the third sub-set of solid-state emitters is operatively coupled in series.

12. The solid-state lamp of claim 10, wherein:
    the first sub-set of solid-state emitters comprises two solid-state emitters;
    the second sub-set of solid-state emitters comprises two solid-state emitters; and
    the third sub-set of solid-state emitters comprises eight solid-state emitters.

13. The solid-state lamp of claim 1, wherein the solid-state lamp is configured as at least one of a BR40 lamp, a BR30 lamp, a PAR38 lamp, a PAR30 lamp, a PAR20 lamp, an A19 lamp, an A21 lamp, a T5 lamp, and a T8 lamp.

14. A method of promoting plant growth via a solid-state lamp, the method comprising:
    emitting, via a first solid-state emitter of the solid-state lamp, light comprising a first local emission peak at a wavelength between 400-500 nm and having a first spectral power distribution intensity;
    emitting, via a second solid-state emitter of the solid-state lamp, light comprising a second local emission peak at a wavelength between 500-600 nm and having a second spectral power distribution intensity, wherein the first local emission peak is of greater amplitude than the second local emission peak, and wherein the second spectral power distribution intensity normalized to the first spectral power distribution intensity is in the range of about 0.15-0.35; and
    emitting, via a third solid-state emitter of the solid-state lamp, light comprising a third local emission peak at a wavelength between 600-700 nm and having a third spectral power distribution intensity, wherein the third local emission peak is the only local emission peak at a wavelength between 600-700 nm, and wherein the third spectral power distribution intensity normalized to the first spectral power distribution intensity is in the range of about 2.4-2.8.

15. The method of claim 14, wherein at least one of:
    a spectral power of the light at a wavelength between 600-700 nm is in the range of about 2.2-3.0 times a spectral power of the light at a wavelength between 400-500 nm; and a spectral power of the light at a wavelength between 600-700 nm is in the range of about 2.5-3.0 times a spectral power of the light at a wavelength between 400-500 nm.

16. The method of claim 14, wherein at least one of:

a photosynthetic photon flux of the light at a wavelength between 600-700 nm is in the range of about 3.5-4.5 times a photosynthetic photon flux of the light at a wavelength between 400-500 nm; and a photosynthetic photon flux of the light at a wavelength between 600-700 nm is in the range of about 3.8-4.2 times a photosynthetic photon flux of the light at a wavelength between 400-500 nm.

17. The method of claim 14, wherein the first spectral power distribution intensity, the second spectral power distribution intensity, and the third spectral power distribution intensity are of sufficient magnitude to stimulate at least one of stem growth, foliage growth, flower growth, and fruit growth.

18. A solid-state lamp comprising:

a first plurality of solid-state emitters electrically coupled in series and configured to emit light of a wavelength between 400-500 nm and characterized by a first local emission peak at a wavelength between 440-460 nm;

a second plurality of solid-state emitters electrically coupled in series and configured to emit light of a wavelength between 500-600 nm and characterized by a second local emission peak at a wavelength between 520-550 nm; and a third plurality of solid-state emitters electrically coupled in series and configured to emit light of a wavelength between 600-700 nm and characterized by a third local emission peak at a wavelength between 630-680 nm;

wherein:

the first local emission peak is of greater amplitude than the second local emission peak;

the third local emission peak is the only local emission peak at a wavelength between 600-700 nm;

a photosynthetic photon flux of the light at a wavelength between 600-700 nm is in the range of about 3.5-4.5 times a photosynthetic photon flux of the light at a wavelength between 400-500 nm; and a photosynthetic photon flux of the light at a wavelength between 600-700 nm is in the range of about 3.8-4.2 times a photosynthetic photon flux of the light at a wavelength between 400-500 nm.

19. The solid-state lamp of claim 18, wherein the solid-state lamp is self-ballasted.

20. A lighting system comprising:

the solid-state lamp of claim 18; and a luminaire configured to be operatively coupled with the solid-state lamp.

* * * * *